United States Patent [19]

Hockman

[11] 3,964,464

[45] June 22, 1976

[54] SOLAR RADIATION COLLECTOR AND CONCENTRATOR

[75] Inventor: Vernon J. Hockman, Oak Ridge, Tenn.

[73] Assignee: Oak Ridge Solar Engineering, Inc., Oak Ridge, Tenn.

[22] Filed: Apr. 8, 1975

[21] Appl. No.: 566,104

[52] U.S. Cl. .............................. 126/270; 126/271; 350/293; 350/299
[51] Int. Cl.² .......................................... F24J 3/02
[58] Field of Search ............ 126/270, 271; 237/1 A; 60/641; 350/293, 299, 294, 295, 301

[56] References Cited
UNITED STATES PATENTS

| | | | |
|---|---|---|---|
| 2,595,905 | 5/1952 | Telkes | 126/270 |
| 2,969,788 | 1/1961 | Newton | 126/271 |
| 3,869,199 | 3/1975 | Cummings | 126/270 |

Primary Examiner—Kenneth W. Sprague
Assistant Examiner—James C. Yeung
Attorney, Agent, or Firm—Herman L. Holsopple

[57] ABSTRACT

A device is described for concentrating solar radiation upon the surface of a helicoidal tube assembly containing a circulating heat transfer medium whereby the energy of said radiation may be collected and utilized. The device consists of a rectangular container wherein is supported a longitudinal plurality of aligned curved reflectors for gathering and concentrating incident solar radiation, multiple vertical reflectors to gather low-angle radiation, a convex radiation concentrating reflector beneath said helicoidal tube and a means for damping excess solar radiation. A method is given for the utilization of said solar radiation collector whereby the heated circulating medium provides the means for heating and cooling buildings.

6 Claims, 6 Drawing Figures

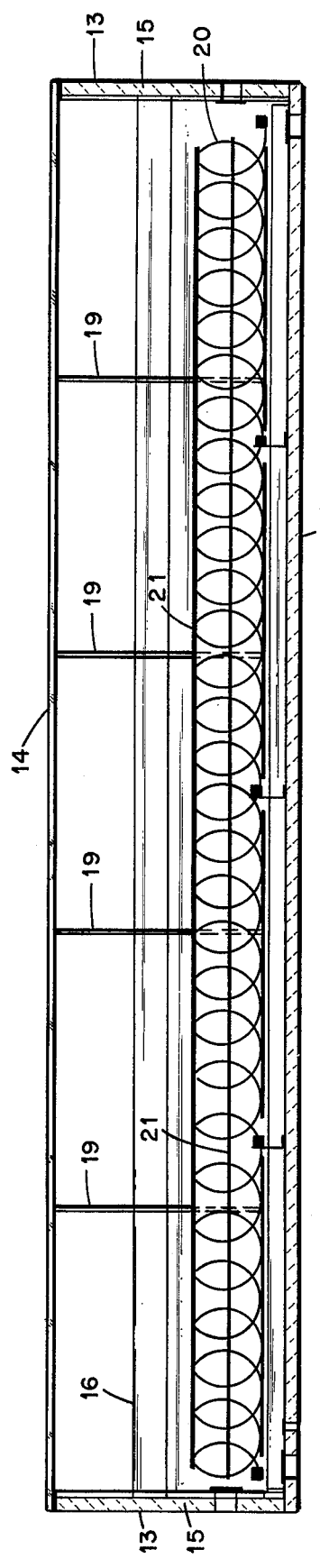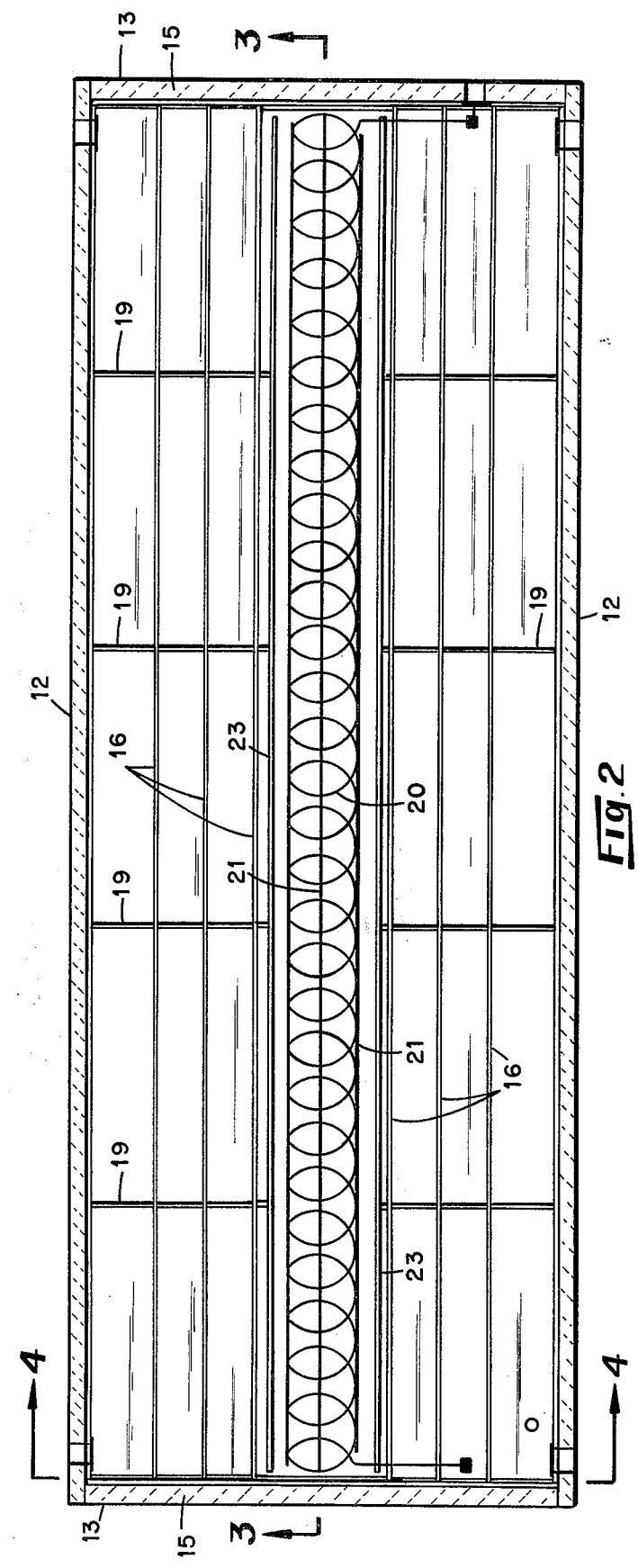

SOLAR RADIATION COLLECTOR AND CONCENTRATOR

BACKGROUND OF THE INVENTION

The invention described herein relates generally to systems for collecting and storing radiation emanating from the sun and more particularly to a novel and improved device for concentrating radiant solar energy and including a method whereby said device is used for the purpose of heating and/or cooling buildings or other structures. It is an improvement of known solar heating devices such as that of Henry Anderson, Jr., U.S. Pat. No. 3,861,379, W. C. Lee, U.S. Pat. No. 2,994,318, H. W. Caplan, U.S. Pat. No. 3,841,738, and D. E. Hervey, U.S. Pat. Nos. 3,321,012, and 3,262,493.

Current concern over the depletion of fossil fuels has renewed public interest in providing alternative energy sources. Solar energy has long been recognized as being one of the most promising sources of energy for the future. In the past a great variety of proposals have been offered for harnessing this virtually limitless and non-polluting energy source. These suggestions have ranged from huge desert solar farms to orbiting satellites beaming the sun's energy back to receiving stations on earth.

While individual solar units are presently being used in some parts of this country for heating, air conditioning and hot water, it has generally been more economical to use cheaper alternatives such as electricity or gas.. In addition to the initial cost of the solar collection equipment it has also been necessary to provide 100 percent standby capacity for use during protracted periods of bad weather. With the present incentive to conserve natural resources, past considerations in opposition to the use of solar collection equipment are no longer as impelling.

In the past, systems for utilizing solar energy have consisted, generally, of: (1) a flat-plate collector having a large glazed surface for absorbing the sun's heat, said glazed surface comprising one or more sheets of glass or a radiation-transmitting plastic film or sheet; (2) tubes or fins for conductng or directing a heat-transfer fluid from an inlet duct to an outlet and thence to an insulated storage area; (3) a metallic plate which may be flat, corrugated, or grooved, to which the tubes or fins are attached in a manner which produces a good thermal bond; (4) insulation, to minimize downward heat loss from the plate; and (5) a container or casing which holds the foregoing components and protects them. Such systems have been constructed from many different materials and in a wide variety of designs. Flat-plate collectors have been arranged in series and in parallel, and are usually deployed in large numbers together, facing south in the United States. They have been used to heat such fluids as water, water plus ethylene glycol, water plus ammonia, fluorinated hydrocarbons, air and other gases. Pumps are usually provided to circulate the heat-transfer fluid through the collector and to thereby provide space heat, hot water or air conditioning.

Several studies have shown that temperatures far above those attainable by flat-plate collectors can be reached if a large amount of solar radiation is concentrated upon a relatively small collection area. To this end, paraboloidal concentrators, similar to searchlight reflectors, have been developed to follow the apparent movement of the sun. These and other diurnal tracking devices have attained relatively high temperatures but require, in general, complicated mechanisms for their operation and can use only the direct rays of the sun, since diffuse radiation cannot be concentrated.

The principle use of concentrating collectors in the past has been in the production of steam or high-temperature fluids for use in refrigeration or power generation. The higher cost and mechanical complexity of solar concentrators which must follow the sun, and their inability to function at all on cloudy or overcast days, are disadvantages which have, in the past, discouraged their development. None of the known prior art methods and devices have incorporated the combination of features and objectives as are outlined in the following summary of the invention.

SUMMARY OF THE INVENTION

A principal object of the subject invention is to provide a new and useful device for the efficient collection and concentration of solar energy in amounts sufficient for normal heating and/or cooling of buildings or other structures.

It is another object of the invention to provide an improved solar energy collector having a new and useful system of curved horizontal and vertical reflectors adjusted in combination for concentrating radiant solar energy upon a common focal axis.

It is a further object of the invention to provide an improved solar energy concentrator capable of operating efficiently in a stationary mount thereby eliminating diurnal tracking mechanisms which contribute to greater initial cost as well as increased maintenance and operating expense.

It is still another object of this invention to provide a solar energy collector and concentrator having a helicoidal fluidbearing tube with more than seven times the heat-absorbant area of a straight-through fluid-bearing tube.

Another object of the subject invention is to provide a coiled fluid-bearing heat transfer tube whose entire inner and outer surfaces are exposed to and receptive of incident radiation.

It is a still further object of this invention to provide primary and secondary sealed enclosures, having high light transmission properties, surmounting a coiled fluid-bearing transfer tube whereby at least 86 percent of incoming shortwave solar radiation is retained within said sealed enclosures while virtually none of the longwave thermal radiation is lost by transmission.

The invention, accordingly, comprises a primary enclosure assembly formed from a weatherproof metal and defining a generally rectangular mounting surface, a transparent cover portion for said primary enclosure assembly, a longitudinal series of concentric curved reflective surfaces supported within said mounting surface and being operable to reflect incident solar radiation toward a common focal axis extending longitudinally of said primary enclosure assembly, multiple vertical reflectors positioned perpendicular to said longitudinal series of concentric curved reflective surfaces and being operable to reflect low-angle solar radiation toward said common focal axis, a helicoidal fluid-bearing tube longitudinally mounted within said rectangular mounting surface and being positioned at the common focal axis of incident solar radiation reflected from said longitudinal series of concentric curved reflective surfaces and at the common focal axis of low-angle solar radiation reflected from said multiple vertical reflectors, a convex radiation reflector longitudinally mounted below and along an axis parallel to said helicoidal fluid-bearing tube and being operable to concentrate incident and low-angle radiation upward onto said helicoidal fluidbearing tube, a secondary transparent housing assemlby within said primary enclosure assembly, longitudinally mounted above and along an axis parallel to said helicoidal fluid-bearing tube and said convex radiation reflector, and means for preventing excess solar radiation from striking said secondary transparent housing assembly.

Further features and objects of the invention will be apparent from an examination of the accompanying drawings which illustrate the invention.

BRIEF DESCRIPTION OF THE DRAWINGS

FIG. 2 is a top plan view of the device of FIG. 1.

FIG. 3 is a sectional view of the invention taken as of the line 3—3 in FIG. 2.

Similar reference characters refer to similar parts throughout the several views of the drawings.

DESCRIPTION OF THE PREFERRED EMBODIMENT

Figure 1:
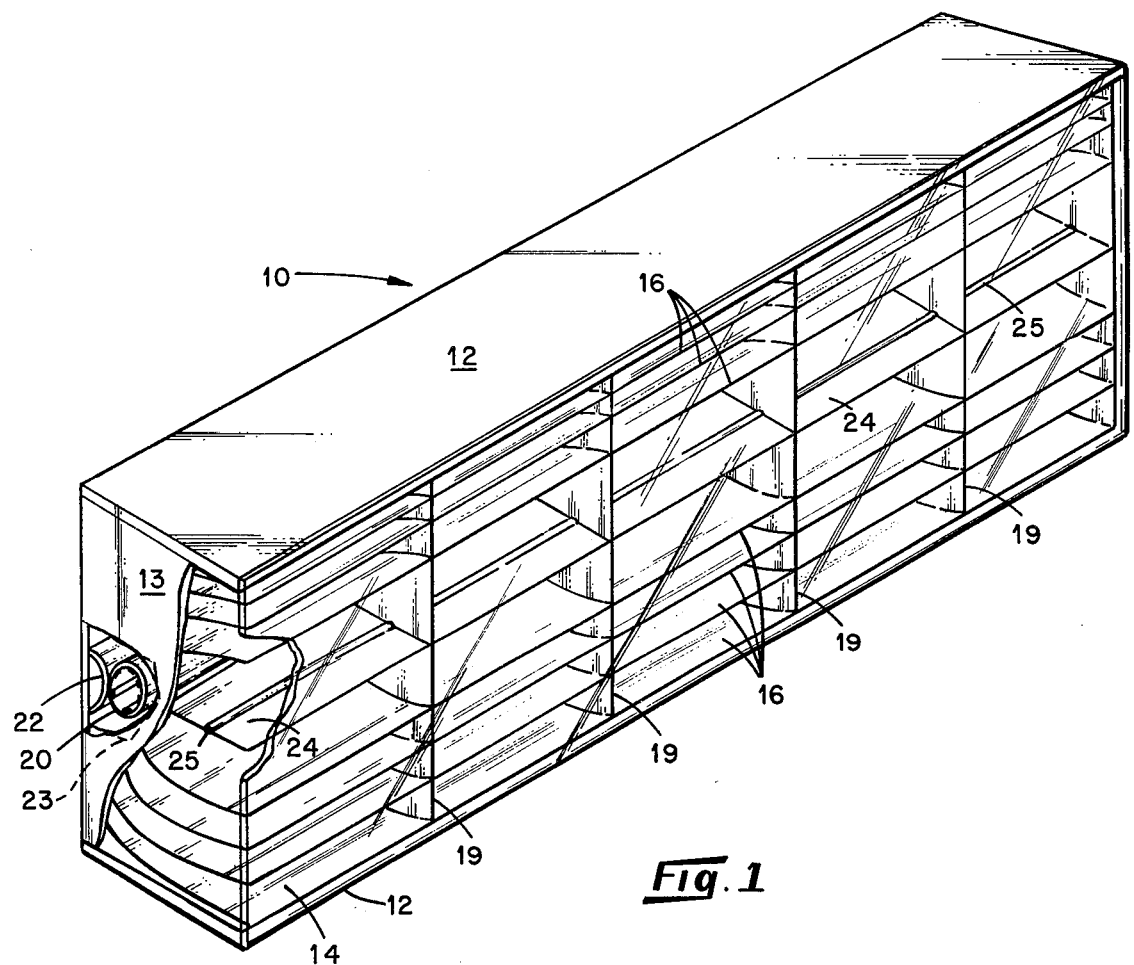
FIG. 1 is a perspective view of the device embodying the invention partly broken away to better show the construction thereof.

Referring to the several drawings in detail, the invention comprises an outer enclosure assembly 10 formed from a weatherproof metal such as aluminum or stainless steel that defines a generally rectangular mounting surface. Outer enclosure assembly 10 comprises a base 11, side walls 12, end walls 13, and a transparent cover portion 14. Transparent cover portion 14 may consist of any high impact glass or plastic material permeable to at least 86 percent of incoming shortwave solar radiation and capable of retaining virtually all longwave thermal radiation. Transparent cover portion 14 may consist of one or more sections, can be hingedly mounted to side walls 12 or end walls 13 and can be sealed with conventional heat-resistant sealants to said side walls 12 and end walls 13.

Base 11, side walls 12, and end walls 13 are provided with a layer of any conventional block insulation 15 rated to withstand up to 600°F.

A plurality of longitudinally aligned curved reflective surfaces 16 supported by channel strips 17 operate to reflect incident solar radiation, shown by the arrows in FIG. 5, toward a common focal axis which extends longitudinally of said outer enclosure assembly 10, as is more fully described hereinafter.

Multiple vertical flat reflectors 19 are positioned perpendicular to the plurality of longitudinally aligned curved reflective surfaces 16 and operate to support said longitudinally aligned curved reflective surfaces 16 and to reflect low-angle solar radiation toward a common focal axis.

Figure 4:
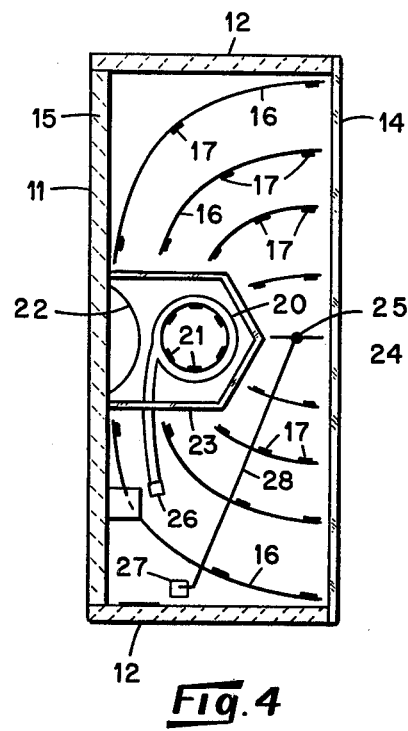
FIG. 4 is a sectional view of the invention taken as of the line 4—4 in FIG. 2.
Figure 5:
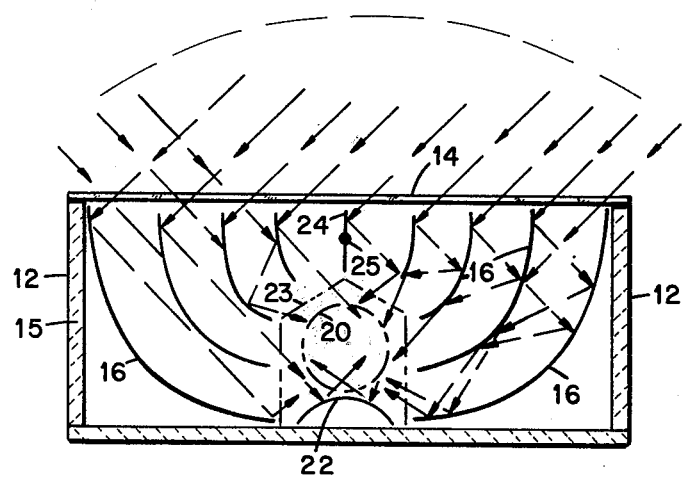
FIG. 5 is a sectional view of the device of FIG. 1 taken as of the line 4—4 in FIG. 2 showing the manner in which solar radiation can be focused according to the invention.

Referring to FIGS. 2, 3, 4, 5, a helicoidal fluid-bearing tube 20 is longitudinally mounted within said outer enclosure assembly 10. As seen in FIG. 5, helicoidal fluid-bearing tube 20 is positioned at the common focal axis of solar radiation reflected from the longitudinal plurality of aligned reflective surfaces 16. Similarly, where the angle of incidence of solar radiation is equivalent to the angle of reflection, low-angle radiation arriving at multiple vertical reflectors 19 is reflected toward the inner and outer surface of helicoidal fluid-bearing tube 20 in the same manner. Thus, according to the design and intent of this invention most of the arriving solar radiation impinges upon and is absorbed at a common focal axis as is represented by the geometric configuration of helicoidal fluid-bearing tube 20.

Fluid-bearing helicoidal tube 20 is constructed of copper in the preferred embodiment and is supported by multiple copper straight bar fins 21 bonded thereto at spaced intervals. Both helicoidal tube 20 and four to eight straight bar fins 21 are painted black in the preferred embodiment. The heating efficiency of the subject solar collector is thereby increased by reason of the increased absorbant capacity of helicoidal fluid-bearing tube 20 and said multiple straight bar fins 21 bonded thereto.

As seen in FIG. 4, a convex radiation reflector 22 is longitudinally mounted below and along an axis parallel to helicoidal fluid-bearing tube 20. Convex radiation reflector 22 is operable to reflect incident and low-angle solar radiation upward onto the inner and outer surfaces of said helicoidal fluid-bearing tube 20 thus acting to further intensify and concentrate solar energy for the useful purposes described herein.

Referring to FIG. 4, a secondary sealed enclosure, the transparent coil housing assembly 23 is longitudinally mounted above and along an axis parallel to both helicoidal fluid bearing tube 20 and convex radiation reflector 22. Transparent coil housing assembly 23 may consist of any high impact, low reflectivity glass or plastic material permeable to at least 86 percent of incoming shortwave solar radiation and is capable of retaining virtually all longwave thermal radiation. Transparent coil housing assembly 23 has the function of maintaining maximum temperatures on the surface of helicoidal fluidbearing tube 20 and, in fact, provides a temperature increase of more than 60°F by preventing heat loss through normal convective air movements within sealed outer enclosure assembly 10.

Provision is made for the possibility of an excess of solar radiation arriving at helicoidal fluid-bearing tube 20 by the inclusion of vertical radiation reflector-damper 24 as shown in FIG. 4. During periods wherein the heated liquid in said helicoidal fluid-bearing tube 20 reaches a preset high temperature (approximately 250°F, when using a mixture of ethylene glycol and water) vertical radiation reflector-damper 24 pivots on shaft 25 in response to temperature sensing probe 26 mounted in the return portion of helicoidal tube 20. Temperature sensing probe 26 is preset to activate thermostatic controller 27 which is comprised of two metals hving different coefficients of expansion whereby vertical radiation reflectordamper 24 is mechanically moved to a closed position by actuating arm 28. As the temperature falls, vertical radiation reflectordamper 24 is reopened on command of temperature sensing probe 26 and the process repeats itself automatically. Thus, up to one-third of the available solar energy can be utilized or rejected automatically in accordance with the thermostatically sensed demands of the system. Within limits imposed by available solar energy, the temperature can thereby be maintained at a constant value.

Figure 6:
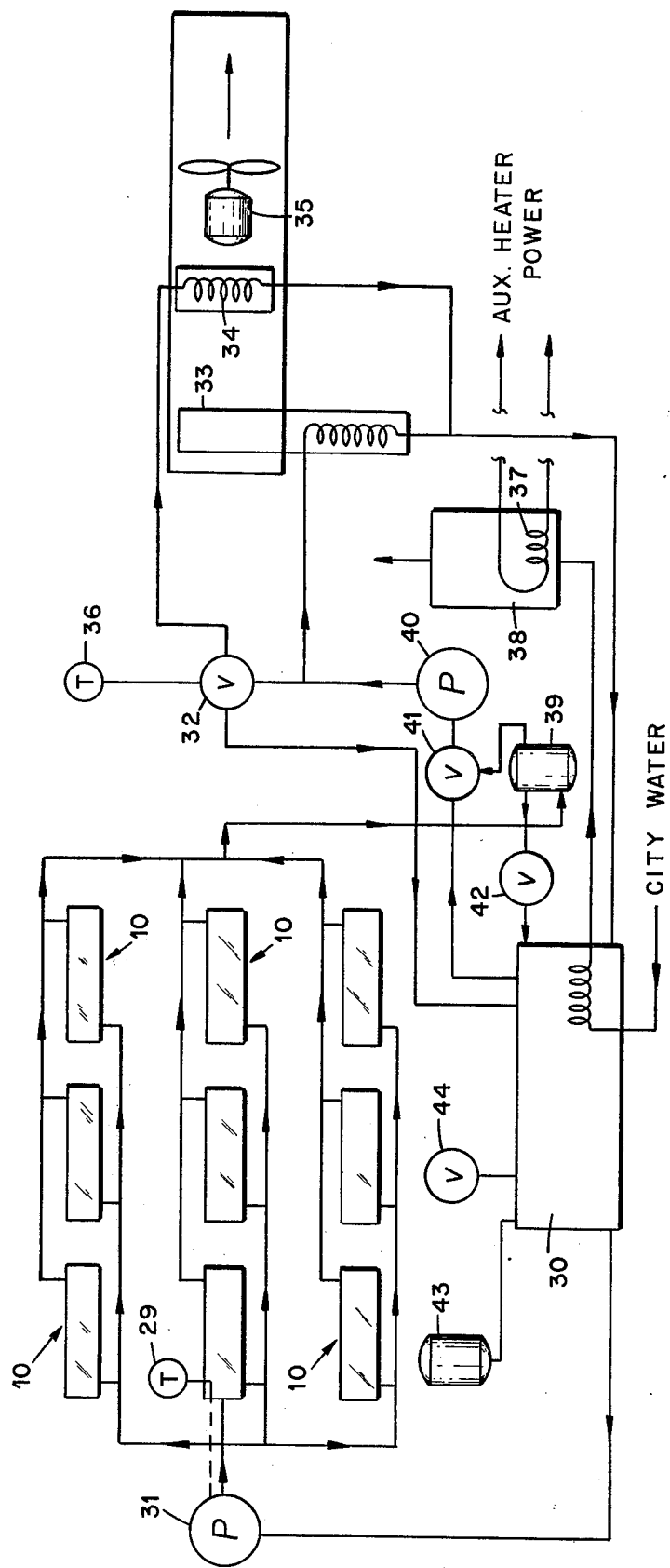
FIG. 6 is a schematic flow diagram showing the manner in which the invention is utilized.

A schematic flow diagram of the solar heating and cooling system of the subject invention is shown in FIG. 6 to illustrate the manner in which the device described herein can be utilized for heating and cooling buildings or other structures. Referring to FIG. 6, solar collector panels 10 may be connected in series, parallel, or series-parallel in accordance with local weather conditions and the heating and/or cooling requirements of particular geographic localities. When installed on structures having a pitch of 30° to 45° said collector panels 10 will operate at full efficiency. In any case, the units are installed midway between the sun's rising and setting locations with the front glass facing southward in the United States.

A heat transfer liquid comprising a balanced mixture of ethylene glycol with anti-corrosive agents and water which may be circulated on demand by thermostat 29 from storage tank 30 is pumped to said solar collector panels 10 by means of solar collector pump 31 and thence to booster tank 39. Booster tank 39, placed in the line between collector panels 10 and storage tank 30 provides for high demand situations wherein all heated liquid is pumped by way of demand pump 40 and modulating valves 32, 41 as required to heating units 34 or, alternatively, to absorption air cooling units 33 whereupon the heated or cooled air is forced by fan 35 through conventional ducts to the desired locations. Modulating thermostat 36 provides automatic control of the heat transfer liquid whereby said liquid can flow to either heating or cooling units, as required. As demand lessens modulating valve 42 directs the capacity of booster tank 39 to storage tank 30 for future use. Valve 42 is normally closed but opens autoumtically when the temperature of the fluid in booster tank 39 reaches a predetermined high temperature (200°F, for example).

Solar collector pump 31 will operate continuously when the system is being used for heating or cooling and may be controlled by any conventional conveniently placed switch or thermostat.

When fluid in storage tank 30 reaches a predetermined minimum temperature (100°F, for example), auxiliary heater 37 is activated to bring the fluid temperature in water heater tank 38 to said minimum.

Storage tank 30 is provided with an expansion tank 43 and pressure relief valve 44 according to standard building practices and it is, of course, understood that the system herein disclosed would incorporate all safety features and fixtures mandated by governmental plumbing, heating and air conditioning codes and regulations.

The aforedescribed solar radiation collector and concentrator has been developed for the purpose of heating a circulating liquid in a closed system whereby this liquid provides the means for heating and cooling various buildings and other structures. The subject device provides an efficient and useful new technique for collecting solar radiation that is capable of operating in a stationary mount whereby its use would eliminate more expensive and complicated diurnal tracking devices.

As is apparent from the foregoing description, the relative simplicity of the invention should enable the system to be utilized in competition with more conventional fuels with no economic disadvantage.

A preferred embodiment of this invention has been set forth in the description and drawings. These descriptions are used in the generic sense only and not for purposes of limitation. The height, for example, of vertical reflectors 19 and longitudinally aligned curved reflective surfaces 16 is not limited to a plane surface parallel to base 11 of outer enclosure assembly 10. Various design and structual changes may be made in these and other components without departing from the spirit and scope of the invention.

What is clamed is:

1. A solar radiation collector and concentrator comprising:
   a. an enclosure assembly formed from weatherproof metal and defining a generally rectangular mounting surface;
   b. a transparent cover portion for said enclosure assembly;
   c. a longitudinal plurality of aligned curved reflective surfaces supported within said mounting surface and being operable to reflect incident solar radiation toward a common focal axis extending longitudinally of said enclosure assembly;
   d. multiple vertical reflectors positioned perpendicular to said plurality of longitudinal aligned curved reflective surfaces and being operable to reflect low-angle solar radiation toward said common focal axis;
   e. a helicoidal fluid-bearing tube longitudinally mounted within said enclosure assembly and being positioned at the common focal axis of solar radiation reflected from said longitudinal plurality of aligned curved reflective surfaces and at the common focal axis of low-angle solar radiation reflected from said multiple vertical reflectors;
   f. a convex radiation reflector longitudinally mounted below and along an axis parallel to said helicoidal fluid-bearing tube and being operable to reflect incident and low-angle solar radiation upward onto said helicoidal fluid-bearing tube;
   g. a transparent coil housing assembly within said enclosure assembly longitudinally mounted above and along an axis parallel to both the helicoidal fluid-bearing tube and the convex radiation relector; and
   h. means for preventing excess solar radiation from striking said transparent coil housing assembly.

2. fluid bearing solar radiation collector and concentrator as recited in claim 1 wherein the means for preventing excess solar radiation from striking said transparent coil housing assembly comprises a vertical radiation reflector-damper pivotally mounted perpendicular to and along an axis above and parallel to said helicoidal fluidbearing tube and means for pivoting said vertical radiation reflector-damper to admit or to block incident solar radiation.

3. A solar radiation collector and concentrator as recited in claim 2 wherein the means for pivoting said vertical radiation reflector-damper comprises a thermostatically controlled actuating arm and means interconnecting said thermostatically controlled actuating arm whereby said vertical radiation reflector-damper is activated.

4. A solar radiation collector and concentrator as recited in claim 3 wherein said interconnecting means consists of a temperature sensing probe mounted in the return portion of said helicoidal tube operable to activate said thermostatically controlled actuating arm attached to said vertical radiation reflector-damper.

5. A solar radiation collector and concentrator as recited in claim 1 wherein said transparent cover portion for said enclosure assembly comprises a high impact material permeable to at least 86 percent of incoming shortwave solar radiation.

6. A solar radiation collector and concentrator as recited in claim 1 wherein said transparent coil housing assembly comprises a high impact material permeable to at least 86 percent of incoming shortwave solar radiation.

* * * * *